United States Patent [19]

Schott et al.

[11] Patent Number: 4,868,374

[45] Date of Patent: Sep. 19, 1989

[54] SELF-CONTAINED DETECTOR DEVICE FOR CHECKING INFORMATION RECORDED ON A CARRIER

[75] Inventors: Michel Schott, Vendenheim; Jean M. Reibel, Strasbourg, both of France

[73] Assignee: Info Media Communication, France

[21] Appl. No.: 31,412

[22] Filed: Mar. 30, 1987

[30] Foreign Application Priority Data

Apr. 10, 1986 [FR] France ............................... 86 05321

[51] Int. Cl.⁴ ............................................. G09B 7/06
[52] U.S. Cl. .................................... 235/441; 434/338; 434/341
[58] Field of Search ................ 235/441; 434/338, 339, 434/340, 341

[56] References Cited

U.S. PATENT DOCUMENTS

| | | | |
|---|---|---|---|
| 4,004,843 | 1/1977 | Boenning et al. | 439/86 |
| 4,183,152 | 1/1980 | Harris, III | 434/341 |
| 4,306,870 | 12/1981 | Phipps | 434/341 |
| 4,360,727 | 11/1982 | Lehman | 235/411 |

FOREIGN PATENT DOCUMENTS 2116165  7/1972  France .
8302842  8/1983  World Int. Prop. O. .......... 434/436

OTHER PUBLICATIONS

R.C.A. Technical Notes, No. 1315, Oct. 12, 1982, pp. 1-4, Test Fixture for Testing Chip Carrier Devices Assembled in Larger Circuits.

Primary Examiner—A. D. Pellinen
Assistant Examiner—Jeffrey A. Gaffin
Attorney, Agent, or Firm—Wall and Roehrig

[57] ABSTRACT

A self-contained detector device for educational or amusement purposes cooperates with conducting and non-conducting zones of a carrier. The detector is in the form of an elongated hollow body with a reading or detecting head projecting from one end. The head is rigidly mounted on a printed circuit board that travels slidably in the hollow body. When the detector is in use on the carrier, pressure causes the head and board to slide up into the body and close a spring switch, energizing a detecting circuit on the board and coupled to the head. The head can favorably be formed as a stack of alternate conducting and non-conducting sheets. The non-conducting sheets can be of an elastomer.

8 Claims, 4 Drawing Sheets

SELF-CONTAINED DETECTOR DEVICE FOR CHECKING INFORMATION RECORDED ON A CARRIER

The present invention relates to a self-contained detector device for checking information recorded on a carrier.

French Patent 2 116 165 corresponding to U.S. Pat. No. 3,818,610 describes an educational system in two parts, respectively:

a carrier (paper) containing items of information identified by conducting or non-conducting markings having the same appearance;

and a self-contained electrical detector, designed to come into contact with said markings, and coupled to an electric circuit which delivers a sound or display signal when an electrical contact is made.

This system however has the disadvantage of being limited only to correct answers, of requiring a strong pressure to be applied by the reading head on the markings of the carrier, failing what detection may be affected, and finally of requiring electrical contacts of good enough quality to allow sufficient current to pass through in order to deliver the target signals. This system therefore, has not advanced much, despite the amusement and/or educational interest that it raises.

It is the object of the present invention to overcome the aforesaid disadvantages by proposing a system of the aforesaid type, with carrier and autonomous detector, in which the detector is easy to produce, reliable and strong, and enables the detection not only of correct answers but also of incorrect answers, and finally which does not demand very good quality electrical contacts.

The self-contained detector device according to the invention, which is designed to cooperate with conducting zones of different resistivity in the same carrier, and which is of the type comprising:

an elongated body, a reading head projecting from said body, a circuit operationally coupled to the reading head, capable of delivering a signal as a function of the resistivity of the zone on which the reading head is applied, a source of electrical power is characterized in that the control circuit is constituted by a rigid printed circuit slidable inside the body;

of which one end projects from the body in order to receive the reading head in contact with the tracks of the control circuit, which tracks are supported by the rigid printed circuit, the other end, situated inside the body, comprising a spring switch designed to close the circuit when the head presses against a zone of the carrier, by resting on the bottom of the body.

The invention will be more readily understood on reading the following description, with reference to the accompanying drawings, in which.

The detector device according to the invention essentially comprises an elongated body (1), for example in plastic material, designed to receive a regid printed circuit (2) of which one tapered end (3) receives the reading head (4) projecting from said end (3).

Figure 1:
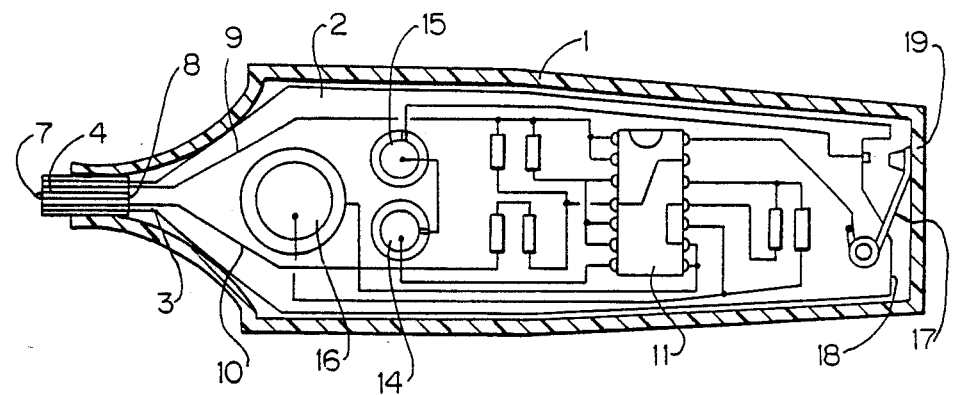
FIG. 1 is a longitudinal cross-section of an autonomous detector device according to the invention.
Figure 2:
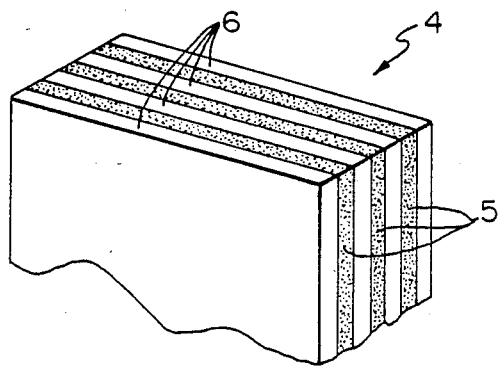
FIG. 2 is a brief perspective view of the reading head according to the invention.

According to an important feature of the invention, the reading head (4) is constituted (FIG. 2) by a stacking of parallel sheets respectively conducting (5) and non-conducting (6), joined together side by side. Said sheets are advantageously made of plastic material, such as elastomer and more particularly silicone. The pitch between two parallel sheets of same nature is about 0.2 mm.

The end (4) may be more or less slidable, depending on the application.

Connection between the end of the rigid printed circuit (2) and the reading head (4) is advantageously achieved by way of a connection piece in plastic material.

The front end (7) of said reading head (4) is designed to come into contact with identification markings (21,22,23) of the carrier, whereas the rear, or better still, the side end (8) is designed to come into contact with conductors (9) and (10) of the printed circuit (2).

Figure 3:
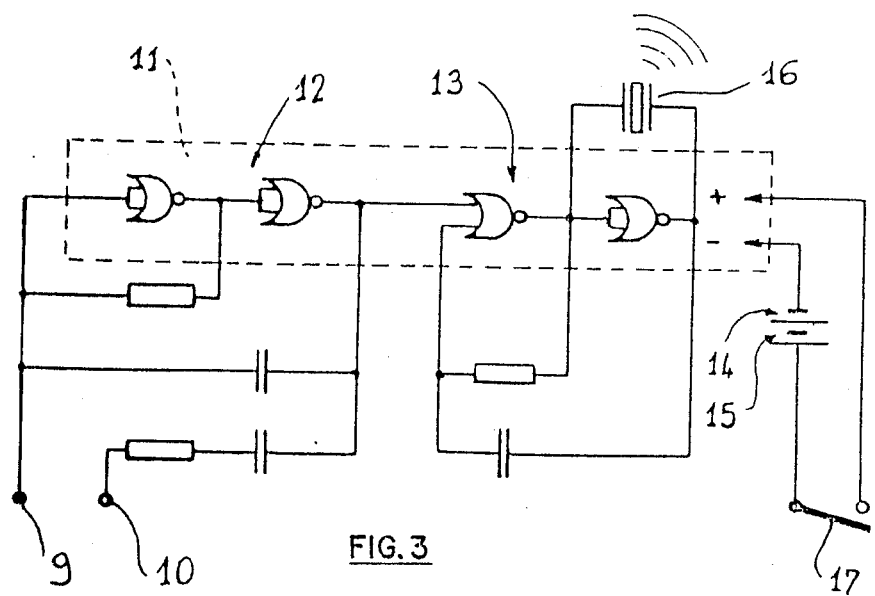
FIG. 3 is an electronic diagram of the autonomous detector device mounted for a sound application.

According to FIG. 3, said rigid printed circuit (2) essentially comprises:

an electronic system of detection (11) constituted by two series (12) and (13) of logic gates in CMOS technology, connected in oscillating assembly, i.e. in the right order, for (12) two inverter gates in series and for (13) one lock input gate in series with one inverter gate; in other words, the series of gates (13) is modulated by the frequency sent by series of gates (12);

two electrical batteries (14,15) for example of 1.5 volts;

a buzzer or sounder (16) constituted of a piezoelectric transducer, connected on the second series (13) of logic gates, a switch (17) placed on the inner end (18) of the printed circuit (2), constituted by a spring blade (17) welded on said printed circuit (2), said switch being provided to supply the control circuit (11).

Figure 4:
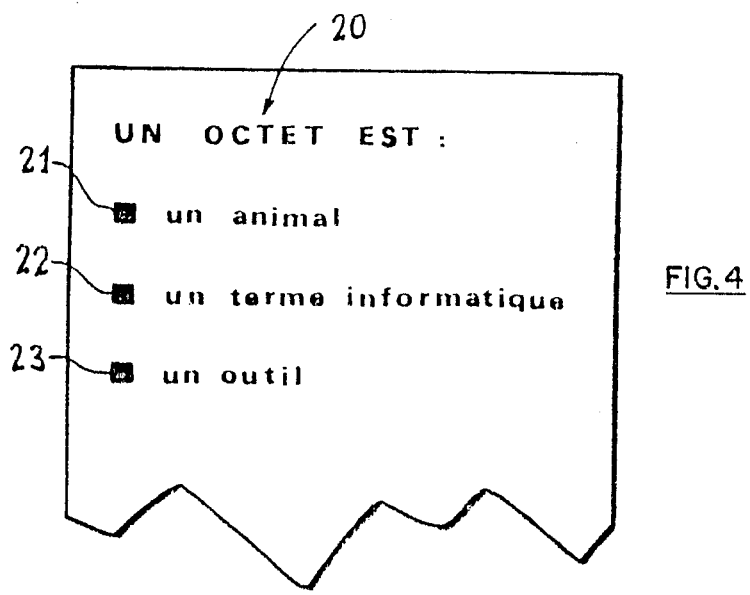
FIG. 4 shows a carrier for use with said detector device.

As can be seen in FIG. 4, the carrier which is for example constituted by a sheet of paper of normal basis weight, comprises a series of items of information (20) associated to zones (21, 22, 23) corresponding to a selection of answers. In known manner, said zones (21,22,23) look the same, but they are printed with different inks, respectively:

with a conducting ink for the zone corresponding to the correct answer (22), with a non-conducting or much less-conducting ink for the zones corresponding to the incorrect answers (21) and (23).

The conducting zones may be either continuous, or formed of a plurality of juxtaposed matrix dots, or of parallel bars.

According to a variant, the identification zones may be constituted by the actual answers.

When the front face (7) of the reading head (4) comes to rest against an incorrect answer zone (21) or (23), the circuit (2), under the pressure thus exerted, slides inside the body (1) until the spring blade (17) of the internal switch rests on the bottom (19) of the body (1), thus closing the control circuit (11).

If, on the contrary, the zone in question (22) corresponds to the correct answer, the terminals of tracks (9) and (10) are then connected by a resistor. The effect of this is to increase the time constant RC of the first series (12) of logic gates so that said series generates a first frequency, for example of a few hertz. The mixture of that first frequency with the frequency generated by the second series of logic gates (13) gives a sharp pulsed sound on the buzzer (16) which identifies a correct answer.

Seeing that the applied technology uses CMOS gates (12,13), the installation uses almost no electrical power, so that any stray resistor between terminals (9) and (10) will not really significantly affect the operation of the detector.

But, if zone (21) or (23) is non-conducting, the value RC of the first series of logic gates (12) is lower, which gives a higher frequency. The combination of this sharp frequency with the frequency generated by the second series (13) gives an unpleasant deep tone, because it is not pure. This then identifies an incorrect answer.

Figure 5:
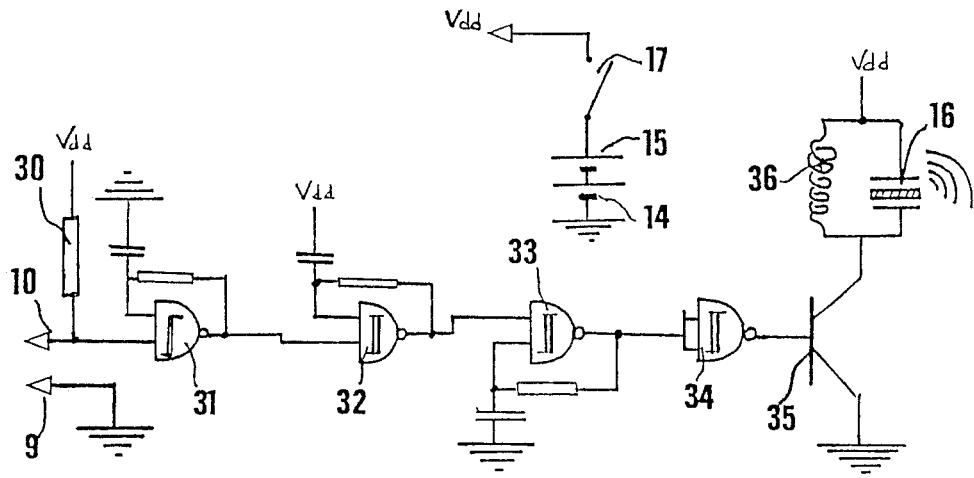
FIG. 5 is another electronic diagram of the self-contained detector device mounted for a sound application.

According to a variant, the electronic detection circuit (2) (FIG. 5) comprises, starting from its two input terminals (9,10), a resistor (30) connected to the positive terminal. The electronic detection circuit (11) proper comprises a series of four CMOS oscillating logic gates, (31-34) respectively, each one generating a different frequency, which gates are designed to energize a piezoelectric transducer acting as a buzzer (16). Said circuit (11) further comprises a transistor (35) coupled with a solenoid (36) and designed to amplify the signal delivered by the transducer (16).

The reliability of the electronic device is much improved, because of the presence on the input of the electronic circuit, of resistor (30), which defines an adjustable switch-over threshold for the system between the two resistors in reference, namely resistor (30) and the resistor materialized by the closure of the external circuit (i.e. the electrical circuit on which pressure is applied with the reading head (4).

Advantageously, the tubular body (1) is perforated close to the transducer (16), which in the illustrated example, is situated towards the opposite end of the reading head (4).

Figure 7:
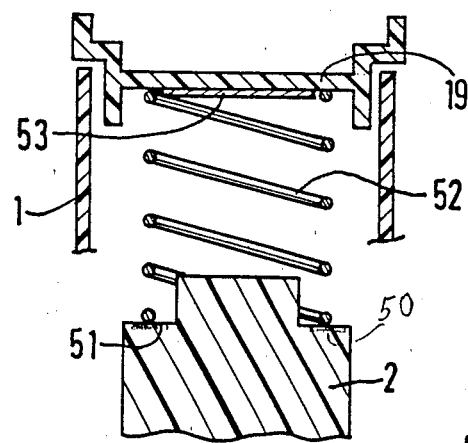
FIG. 7 is a diagrammatical illustration of the preferred spring switch of the electronic circuit in the case of a sound application.

According to another variant, the switch (17) (see FIG. 7) comprises a conducting piece (50) welded on the end of the circuit (2) and which defines a shoulder (51) with respect to the rigid circuit (2), against which shoulder rests a spiral spring (52). The inner end of the bottom (19) of the body (1) is also made from a conducting material (53).

The application of a pressure on the reading head (4) compresses the spring (52) until a contact is made between the conducting piece (50) and the conducting part (53) of the bottom (19). As soon as said pressure is released, said spring cuts off the contact.

Figure 6:
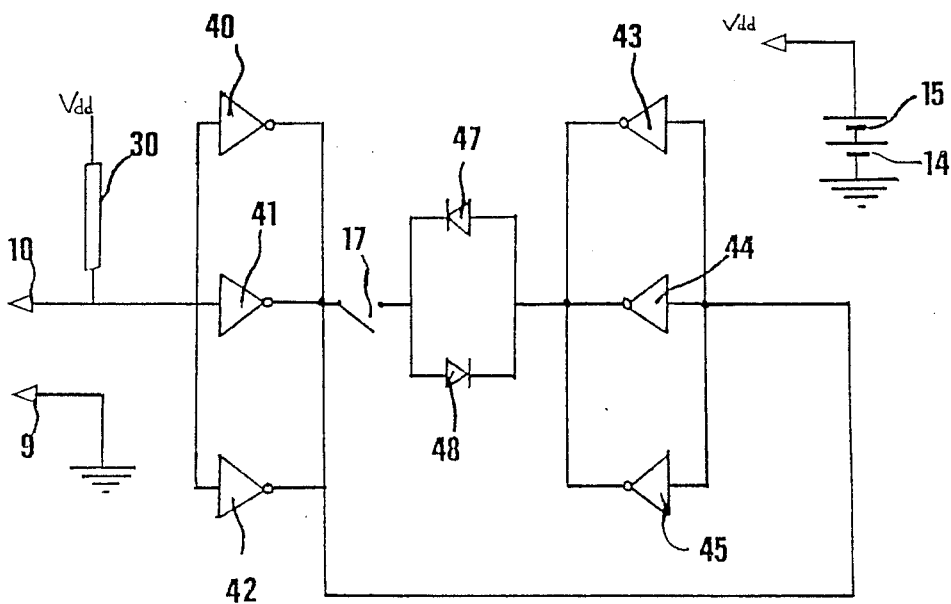
FIG. 6 is an electronic diagram of the self-contained detector device mounted for a display application.

According to another embodiment, the buzzer may be replaced by a set of light emitting diodes (LED) of appropriate colors. In this case, the electronic detection circuit is modified (FIG. 6). The switch-over threshold is, as in the preceding case, advantageously adjustable as a function of the selection of the input resistor (30), connected with the positive terminal of the circuit. The electronic detection assembly comprises six CMOS-type inverter gates (40-45), divided into two groups, one electrically controlling the other, and between which are inserted two LED',(46,47) of different color mounted in head-to-foot fashion. The circuit is powered by means of two batteries (14,15) of 1.5 volts each.

The use of LED's instead of a buzzer presupposes a modification of the spring switch (17) in order to allow the display of a light signal on the end of the body (1) opposite the reading head (4).

Figure 8:
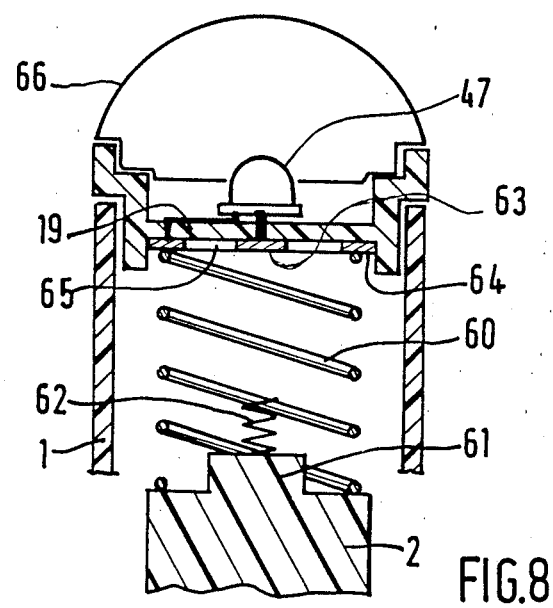
FIG. 8 is a diagrammatical illustration of the preferred spring switch in the case of a display application.

As illustrated in FIG. 8, the switch (17) comprises a coil spring (60) welded on the end of the rigid circuit board (2) and pressing against a shoulder formed on the circuit board (2) by a conducting piece (61) fixed on said circuit. A second coil spring (62) co-axial to the first (60) and fixed on the conducting piece (61) cooperates, when pressure is applied on the reading head (4), with a conducting surface (63) provided on the inner face of the bottom (19) of the body (1).

The conducting surface (63) is separated from a second conducting surface (64) which is annular-shaped and co-planar with surface (63), by a non-conducting annular zone (65). Surface (64) is designed to cooperate permanently with the spring (60). LED's (46,47) are situated above said surfaces (63,64), each of their two terminals being respectively connected to the zones (63) and (64). Advantageously, the LED's are protected by a dome (66) in transparent plastic material.

The detector device according to the invention is characterized essentially by:

a simple construction and low cost, a simple operation no electrical connection movable with respect to the body, hence a considerable improvement of the reliability, the presence of more or less resistive electrical contacts and connections without this affecting the quality of the emitted signal;

the possibility of printing the carriers by the conventional printing techniques, such as for example screen printing.

Thus, the self-contained detector device according to the invention can be used successfully in various sorts of applications, such as amusement, educational or diagnostical applications. It can also be used as a reader in a bar code system instead of the present head which is a conventional optical reading head.

What is claimed is:

1. Self-contained detector device which cooperates with conducting and non-conducting zones of a carrier against which it is contacted to provide a perceptible signal to the user which has one value when a conducting zone of the carrier is contacted and another value when a non-conducting zone of the carrier is contacted, the device comprising an elongated hollow body; a reading head which projects from said body; a rigid printed control circuit board on which said head is affixed and having a control circuit printed thereon with leads connected to said head and having means for delivering said perceptible signal that depends on whether the zone contacted by the head is conducting or non-conducting; and a source of electrical power; wherein said rigid circuit board is slidable within said hollow body with one end of the board, considered in the direction of sliding, having said head affixed thereon, and the opposite end carring a spring switch which closes when said head is pressed against one of the zones of the carrier to energize said circuit, and wherein said head is formed of a stack of parallel, sideby-side alternating conducting sheets and non-conducting sheets.

2. Detector as claimed in claim 1 wherein said non-conducting sheets are of an elastomeric material.

3. Detector as claimed in claim 1 wherein said control circuit includes electronic detector circuit means constituted by two series of logic gates connected in cascade as an oscillator, with a sounder coupled to a second of the two series of logic gates, and with input means connecting a pair of terminals of the first of the two series of logic gates with the leads that are connected to the reading head.

4. Detector as claimed in claim 3 in which said electronic detector circuit means and said sounder produce one audible tone when a non-conducting zone is contacted and a distinctly different audible tone when a conducting zone is contracted by said head.

5. Detector as claimed in claim 1 wherein said control circuit includes electronic detection circuit means constituted of at least three CMOS logic gates coupled in succession to form an oscillator assembly, with an output coupled to a control terminal of a transistor, the transistor having an output terminal coupled to an inductance and a sounder, and input means coupled to said reading head to control the frequency of oscillation of the circuit; and a resistor coupled in series to said input means, said switch, and said power source.

6. Detector as claimed in claim 1 wherein said control circuit includes first logic gate means having an input and an output, said input being coupled by said reading head, second logic gate means having an input coupled to the output of the first logic means and an output, and said perceptible signal delivering means includes first and second LED's of different colors connected in anti-parallel between the outputs of the first and second logic gate means.

7. Detector as claimed in claim 6 wherein said first and second logic gate means are each configured as inverter circuits.

8. Detector as claimed in claim 1 wherein said spring switch includes a coil spring affixed onto a shoulder on the rigid circuit board and pressing against said hollow body to bias said circuit board in the direction to extend said head, and a second coil spring coaxial with the first-mentioned spring which is mounted on a conductive pad on said board and contacts a conductive surface of said body when said head presses against said carrier.

* * * * *